Figure 1:
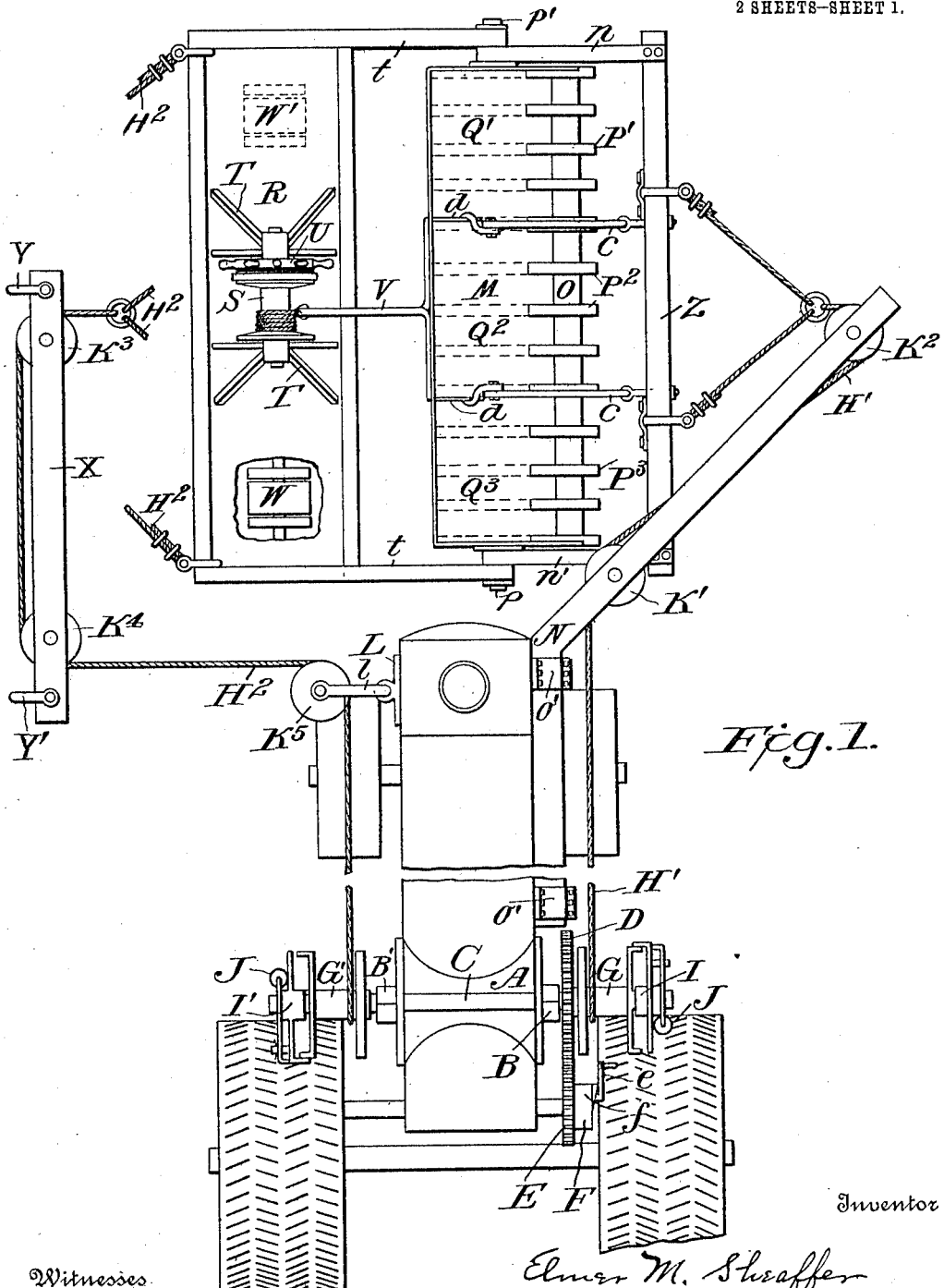

E. M. SHEAFFER.
WHEEL AND DRAG LINE SCRAPER.
APPLICATION FILED FEB. 5, 1912.
1,066,423.
Patented July 1, 1913.
2 SHEETS—SHEET 2.
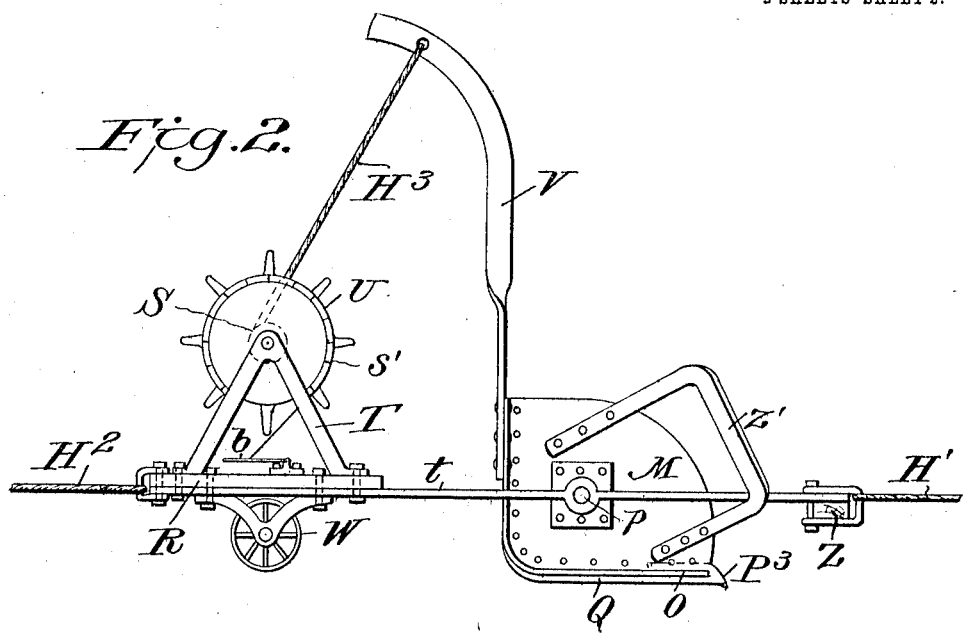
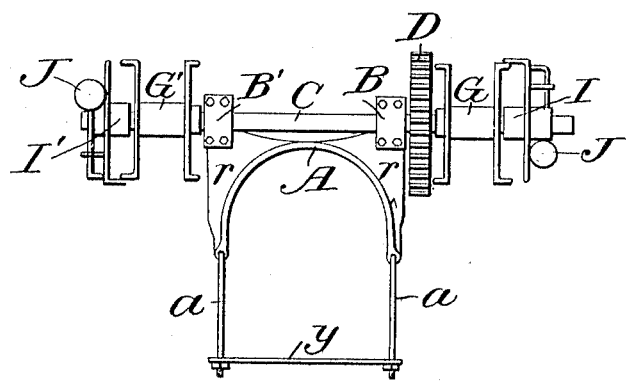

UNITED STATES PATENT OFFICE.

ELMER M. SHEAFFER, OF PROCTOR, COLORADO.

WHEEL AND DRAG-LINE SCRAPER.

1,066,423.      Specification of Letters Patent.      Patented July 1, 1913.

Original application filed October 23, 1911, Serial No. 656,105. Divided and this application filed February 5, 1912. Serial No. 675,608.

*To all whom it may concern:*

Be it known that I, ELMER M. SHEAFFER, a citizen of the United States, residing at Proctor, in the county of Logan and State of Colorado, have invented certain new and useful Improvements in Wheel and Drag-Line Scrapers, of which the following is a full, clear, and exact specification.

This invention relates to improvements in excavating machinery, and has for its object the provision of a scraper and means for operating same particularly adapted for use in building dams and leveling fields, this application being a division of my application filed October 23, 1911, Serial No. 656,105.

Other objects of the invention are to provide a scraper, and attachments by which the same may be operated from any ordinary traction engine, to provide novel means whereby the scraper may be made to cut to a greater or less depth as may be desired, and may be dumped automatically at the desired point, and to improve the construction and increase the efficiency of the excavating apparatus.

The objects of the invention are attained in mechanism the preferred form of which is illustrated in the accompanying drawings and hereinafter fully described.

The novel features of the invention are particularly pointed out in the claim at the end of the description.

In the drawings, Figure 1 is a plan view of the entire apparatus showing it connected with a traction engine; Fig. 2 is an end elevation of the scraper and the carriage connected therewith; Fig. 3 is a rear elevation of the driving shaft and the means for mounting the same on the machine.

The scraper or excavating device of this invention, it will be understood, may be connected to and operated by any preferred form of motor or engine or other power. One form of such operating mechanism I have shown in the accompanying drawings wherein I employ a saddle or arched support A which is adapted to fit over and rest upon the boiler of a traction engine, as shown in Fig. 1, and the sides of which are riveted or otherwise firmly secured to the boiler. The sides of the saddle are reinforced by vertical ribs $r$ thereon which terminate in eyes at their lower ends, said eyes being engaged by the upper ends of links or anchor bolts $a$. The lower ends of these anchor bolts extend through a clamp bar $y$, which passes transversely under the firebox of the engine and suitable nuts on the ends of the links are turned home against the clamp bar thereby securely fastening the saddle in place upon the engine. Bearings B B' are formed on or secured to the saddle at the top thereof and the driving shaft C is journaled in these bearings, as shown and as will be understood. A gear wheel D is mounted on the shaft C at one end of the saddle and meshes with a second gear wheel E which is loosely mounted on the crank or power shaft C' of the engine. A clutch block F is rigid on the power shaft C' at the side of the gear wheel E and a pin $f$ slidably mounted in said block is adapted to lock the same to the said wheel E so that they will rotate together when it is desired to operate the excavator. When it is desired that the excavating mechanism or scraper remain inoperative while the traction engine travels over the field, the locking pin or latch $f$ is rotated by means of a crank handle $e$ at its outer end, said handle thereupon riding upon a cam or beveled surface on the clutch block so that the pin will be drawn outward through the clutch block and released from its engagement with the gear wheel. A reverse rotation of the crank handle, will, of course, move the locking pin inward to lock the gear wheel to the shaft so that the excavator will be operated.

Drums G G' are mounted loosely upon the driving shaft C beyond the sides of the saddle and the scraper-controlling cables H' H² are secured to and wrap around said drums, one cable winding as the other unwinds. Friction clutches I I' are secured upon the driving shaft immediately adjacent the drums and have flanges adapted to engage peripheral surfaces of the drums so as to lock the respective drums to the shaft and thereby cause either drum to wind the cable attached thereto so as to draw the scraper forward or backward. These clutches are operated by pistons mounted in cylinders J J' to which steam is admitted through suitable connections with the steam chest or steam space of the boiler.

Secured by suitable brackets $o$ $o'$ to one side of the boiler (the right side in the present illustration) is a boom or supporting beam N which projects diagonally from the front end of the boiler and carries the guide pulleys K' K² around which the cable H' passes to the scraper M. The said cable is connected to the draft bar Z which is in turn connected with the scraper by means of the links c c and n n', the links c c being pivotally attached to partitions d d of the scraper while the links n n are mounted on the trunnions P P' on the ends of the scraper. On the left side of the boiler, at the front end thereof, is a bracket L upon which is a clevis l a guide pulley K⁵ being journaled in said clevis and the cable H² passing around said guide pulley to the guide pulleys K⁴ K³ and thence to a carriage R arranged in rear of and connected with the scraper. The guide pulleys K³ and K⁴ are mounted in a beam X which, like the boom N, is composed of two I-beams bolted together, clevises or rings Y Y' being provided at the ends of the beam X to receive anchoring cables whereby the beam may be secured at the side of the proposed excavation.

The scraper or excavator M has an open front and top and is composed principally of a thick sheet of iron. Along the front edge of the bottom of the scraper is a steel blade O having its front edge sharpened to cut through the earth while projecting forward from said blade and fitting over and under the same are teeth P', P², P³., etc., which penetrate and break up the earth so that the cutter or blade may readily pass therethrough. The rear ends of the teeth abut the front ends of runners Q', Q², Q³, etc., which extend along the bottom of the scraper and up the back of the same to protect the body of the scraper when it is being drawn over the ground. Riders or yokes Z' are secured to the ends of the scraper and to the partitions d and project upwardly and forwardly therefrom in proper position to support the scraper when it is dumped, the trunnions p, p' being located in rear of the center of gravity so that the loaded scraper will dump automatically when released. To the back of the scraper is rigidly secured a lever arm V which extends upwardly above the scraper and from the upper end of which a cable H³ extends to a drum S on the carriage R. The said drum is mounted in and between the standards T, T', rising from the platform of the carriage, and is equipped at one or both ends with a hand wheel U so that it may be easily manipulated by an operator on the platform. A brake s' is arranged on the drum and acts upon the same, being connected with and controlled by a foot lever b on the platform of the carriage. It will be readily understood that when the foot is removed from the lever b the brake is released and the weight of the load in the scraper will cause it to tilt forward and dump. The hand wheel U is then operated to wind the cable H³ on the drum S and thereby act through the lever arm V to return the scraper to its operative position. The carriage R is mounted on wheels W having a broad tread and is connected to the scraper by coupling bars t t which are bolted to the carriage and have their front ends pivoted upon the trunnions p p' on the ends of the scraper.

The construction and arrangement of the several parts of the apparatus being thus made known, it is thought the operation will be readily understood. The apparatus is designed more particularly for building a fill from a borrow pit in the construction of an earthwork dam. For this purpose, the engine or other operating mechanism is placed at one end of the proposed fill and the beam X carrying the pulleys K³ K⁴ is anchored at a point beyond the proposed borrow pit. The cables H' H² being connected to the scraper and the carriage respectively, and the carriage being disposed close to the beam X, the power of the engine is applied to rotate the driving shaft C and the clutch l is caused to lock the drum G to the shaft so that the cable H' will be wound. The scraper is thereby drawn over the ground and is tilted by the operator on the carriage manipulating the drum S as will be readily understood, the degree of inclination being dependent on the nature of the material to be excavated or the depth of excavation desired. When the scraper is tilted, its teeth and front cutting edge are caused to penetrate the ground so that the travel of the scraper will cause earth, gravel, etc., to flow into and fill the same. When the filled scraper has been drawn to the dumping point, the brake b is released whereupon the weight of the load will cause the scraper to tilt forward and discharge its contents in the fill. The engineer then releases the drum G and locks the drum G' to the driving shaft so as to draw upon the cable H² and thereby return the carriage and scraper to the starting point, the scraper being returned to its filling position by the operator winding the cable H³ on the drum S. During the travel of the scraper the inactive cable is prevented from dropping off the guiding pulleys by applying just sufficient pressure to the drum to prevent slack in the cable as it pays out. The operation is then repeated until the fill has been brought to the desired width and it is to be observed that the diagonal disposition of the forward portion of the boom N carries it away from the plane of the wheels of the engine and the boom should be placed at such a height that the scraper may pass under it, as shown in Fig. 1, thereby dumping outside of the path of the rear engine wheels. When the fill has been brought to the desired width, the pin or latch f is manipulated to release the gear wheel from the coupling block F and the traction gear of the engine is thrown into operation so that the apparatus may be moved forward a distance equal to the width of the scraper. The engine and the beam X are then again anchored and the former operation repeated, these several successive steps being performed as often as necessary to complete the required fill. It will be readily appreciated that the advancing engine rolls and packs the fill so that all the work needed to build the dam will be rapidly, easily and efficiently accomplished.

While my improved apparatus is intended more particularly for use in constructing dams as stated, it may obviously be advantageously employed for various other purposes, such as leveling fields, grading streets, building railroad grades, digging irrigation canals, etc.

My improvements may be attached to any traction engine and the scraper is under full control at all times inasmuch as the operator on the carriage traveling behind and connected directly with the scraper is in a position to instantly detect and cure any improper or unsatisfactory position of the scraper. As the drums G G' are mounted loosely on the driving shaft, the cables $H'$ $H^2$ may wind thereon in the same direction and it is not necessary to reverse the engine in order to reverse the direction of travel of the scraper, the direction of travel being determined by locking one or the other drum to the shaft as above described.

Having thus fully described my invention what I claim as new and desire to secure by Letters Patent of the United States is:—

The combination of a scraper, a carriage back of the scraper and connected therewith, means for effecting travel of the carriage and the scraper, a lever arm rising from the back of the scraper, a drum on the carriage, a cable wound on the drum and connected to the lever arm, means to rotate the drum and wind the cable thereon, a brake acting on the drum, and a foot lever mounted on the carriage and connected to the brake to apply or release the same.

In testimony whereof I have signed my name to this specification in the presence of two subscribing witnesses.

ELMER M. SHEAFFER.

Witnesses:
J. R. HAYNES,
T. B. HICKEY.

---

Copies of this patent may be obtained for five cents each, by addressing the "Commissioner of Patents, Washington, D. C."